(12) United States Patent
Duncan

(10) Patent No.: US 6,267,001 B1
(45) Date of Patent: Jul. 31, 2001

(54) TEST PLUG

(75) Inventor: Scott Duncan, Santa Rosa, CA (US)

(73) Assignee: E Ticket Enterprises, LLC, Santa Rosa, CA (US)

( * ) Notice: Subject to any disclaimer, the term of this patent is extended or adjusted under 35 U.S.C. 154(b) by 0 days.

(21) Appl. No.: 09/401,252

(22) Filed: Sep. 23, 1999

Related U.S. Application Data
(60) Provisional application No. 60/101,758, filed on Sep. 25, 1998.

(51) Int. Cl.$^7$ .............................. G01M 3/04; F16L 55/11
(52) U.S. Cl. ...................... 73/49.8; 73/40.5 R; 73/49.1; 137/68.11; 138/89; 138/90
(58) Field of Search ..................... 73/40.5 R, 46, 73/49.1, 49.8; 137/68.11, 68.19, 68.22; 138/89, 90

(56) References Cited

U.S. PATENT DOCUMENTS

| | | |
|---|---|---|
| 3,338,499 | 8/1967 | Gilbert . |
| 3,496,952 | 2/1970 | Amendola . |
| 4,357,960 | 11/1982 | Han . |
| 4,607,664 | 8/1986 | Carney et al. . |
| 4,739,799 | 4/1988 | Carney et al. . |
| 5,318,075 | 6/1994 | Roll . |

*Primary Examiner*—Daniel S. Larkin
(74) *Attorney, Agent, or Firm*—Malcolm B. Wittenberg

(57) ABSTRACT

A disposable plug for installation in a cylindrical water line to temporarily block the water line to the passage of water therethrough. The disposable plug includes a cylindrically shaped tablet having a diameter substantially equal to the diameter of the water line so that when installed within the water line, water is prevented from passing the disposable plug. The cylindrically shaped tablet is characterized as being at least partially dissolvable when contacted with water. A water impermeable membrane surrounds at least a portion of the cylindrically shaped tablet to selectively prevent water from contacting it as long as the disposable plug acts to temporarily block the water line. The water impermeable membrane can be selectively disrupted allowing water to contact the cylindrically shaped tablet to selectively remove the disposable plug when no longer needed.

11 Claims, 3 Drawing Sheets

TEST PLUG

This application claims benefit of Provisional Application Serial No. 60/101,758 filed Sep. 25, 1998.

TECHNICAL FIELD OF THE INVENTION

The present invention deals with a disposable plug for incorporation in a water waste line for temporarily blocking the passage of water through the line. When plumbing a structure such as a house intended to carry water, the structure goes through several waste line tests to confirm the integrity of the various plumbing joints. This requires temporarily blocking the waste line so that the water lines within the structure can be filled and leaks detected. The present invention involves an improved means of temporarily blocking the water waste line in order to create a suitable water head in order to conduct such testing.

BACKGROUND OF THE INVENTION

When plumbing a structure such as a house, the structure is subjected to at least two different waste water tests. A first test is intended to determine the integrity of the water lines at ground or slab by filling the structure's waste lines with water to create a pressure head. A second test is conducted at "top-out" meaning that after the structure is vented and tubs, sinks and other fixtures installed, the waste lines are again filled with water to create yet another pressure head. Under pressure, the various lines are inspected for leakage prior to the installation of sheetrock which would obviously mask the detection of any leakage.

As background, plumbers are required to "stub out" or create an external waste water outlet two or three feet from the perimeter of a structural foundation. The "stub out" line is typically capped off in order to run the above-described water tests. There are a variety of currently available caps designed to accomplish this task. For example, a plumber may employ a rubber cap with a stainless steel band. However, a rubber cap is prone to being blown off of the "stub out" line if subjected to sufficient water head pressure. In order to prevent this from occurring, the plumber will oftentimes drive a wooden stake in front of the rubber cap. This entails a good deal of additional effort and is not particularly effective in preventing blow-off. As an alternative, a plumber may glue the plastic test cap to the "stub out" which can be knocked off after the test has been conducted. However, this requires applying and setting a suitable adhesive which obviously must later be removed once the test has been completed. At removal, the plumber is likely to get quite wet as the water head pressure is released.

There are additional problems associated with caps employed at "stub out." For example, when a sewer line to the street or septic is about to be connected, the plumber is oftentimes not the party responsible for making the connection. If someone else makes the connection who is unfamiliar with this process, the cap will be cut off or otherwise removed releasing the water head within the structure perhaps prematurely before the plumber has had an opportunity to check the structure for leaks. Even if the plumber is the party responsible for connecting the sewer line to the "stub out," he may still be forced to release his test and then recap the line after the connection has been made thus requiring that the water head be reestablished. This is time consuming and also is a waste of water. Ideally, the plumber would like to maintain a water head throughout the sheetrock process so that any accidental nailing into a waste line would be visible by observing water leakage.

In addition to the above, once the sewer has been connected, it is traditional for the plumber to return to the project to retest his waste lines at which point the plumber employs a wye, a one-eighth bend, and a clean-out plug at the point where the sewer has been connected. A plumber typically employs a long test ball which is inserted into the ⅛ band and wye and is inflated at the appropriate position. The test ball is intended to temporarily block the waste line to again create a suitable pressure head within the structure. However, these test balls are extremely expensive and by reducing pressure within the test ball, they can be removed and oftentimes stolen from the job site. Further, they can inadvertently lose air, slip down the line, and cause a major stoppage which must be dealt with by excavating and exposing the sewer line. The air balls, which exhibit external ribs, crack after repeated usage and tend to leak under test. Leakage from the side wall of the test ball as well as from its air stem obviously results in water leakage to the sewer and reduction of water head thus reducing the effectiveness of the test.

It is thus an object of the present invention to provide a means of temporarily locking a "stub out" or waste water line which can effectively and temporarily prevent passage of water through the waste line thus creating a suitable pressure head within a structure while being easily removable from the waste water line and while addressing all of the drawbacks recited above.

These objects will be more readily apparent when considering the following disclosure and appended drawings.

SUMMARY OF THE INVENTION

The present invention broadly is directed to a disposable plug in a water waste line temporarily blocking the passage of water through the line. The water waste line is provided with a wet side in which water is temporarily trapped by the disposable plug and a dry side which is temporarily rendered water-free while the disposable plug is in the waste line.

The disposable plug comprises a disk of a material which remains structurally intact when dry and which loosens its structural integrity when wet. A moisture barrier is supported by the disk preventing water within the wet side of the line from contacting the disk noting that the disk is sized to completely block water passage through the waste line when in place. Means are provided for either rupturing the moisture barrier or breaking the disk resulting in contacting water with the disk resulting in dissolving the disk and causing it to pass through the water waste line without blocking it or other water lines to which it is connected.

DETAILED DESCRIPTION OF THE INVENTION

Figure 1:
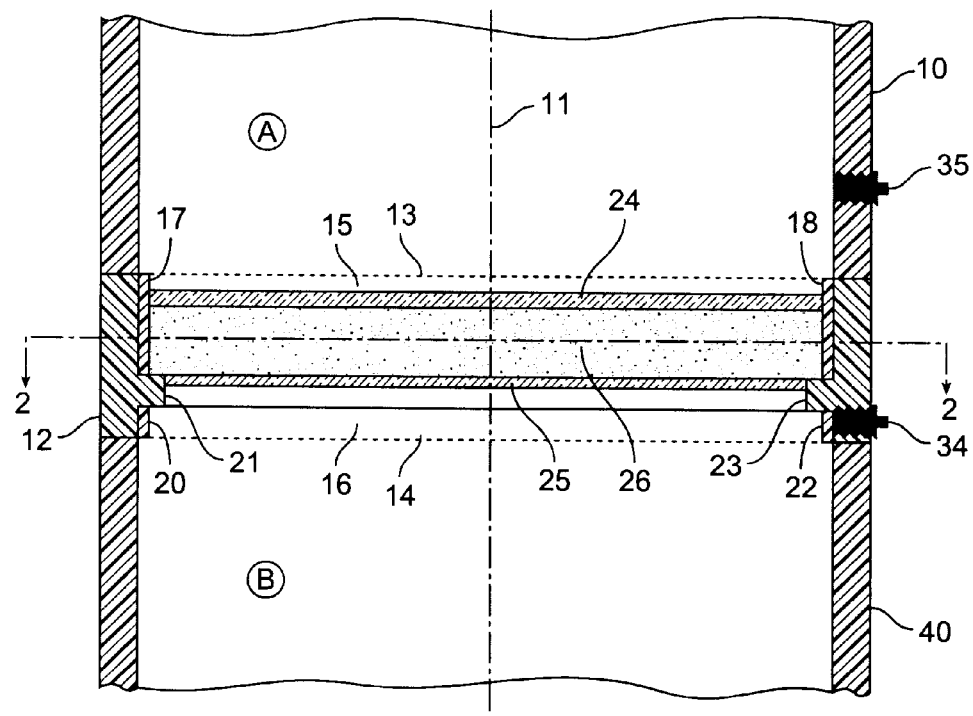
FIG. 1 is a cross-sectional view of one embodiment of the present invention.
Figure 2:
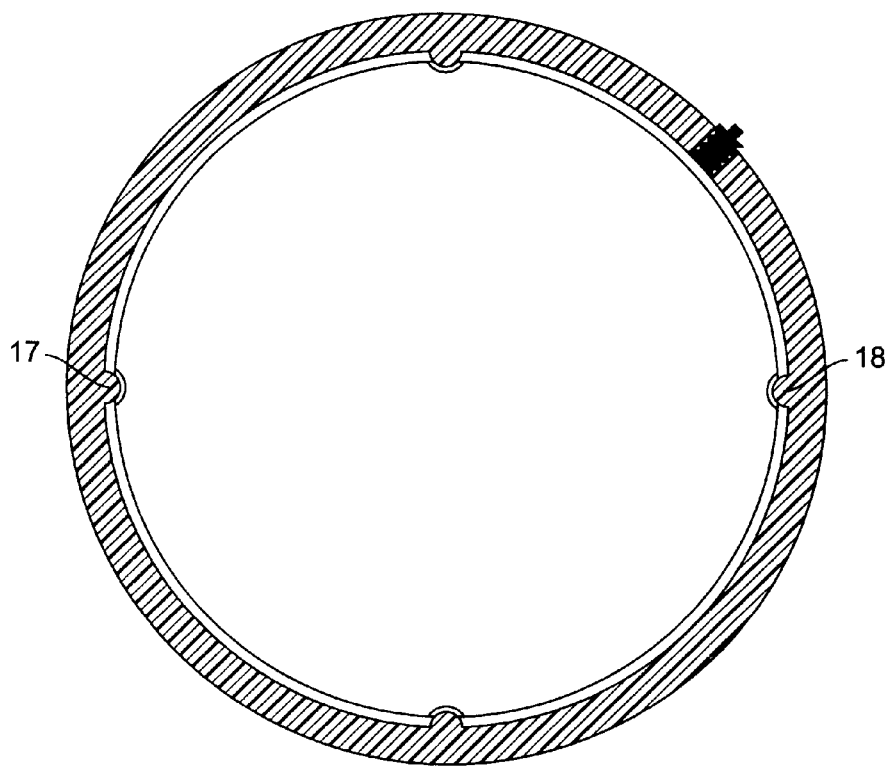
FIG. 2 is a cross-sectional view of the embodiment of FIG. 1 taken through line 2—2 of FIG. 1.

In referring to FIG. 1, pipe 10 comprises a "stub out" or clean-out plug which, as noted, extends from a house or other structure for connection to a sewer or septic line. A cylindrical coupling 12 composed of, for example, PVC or ABS conduit can be aligned along longitudinal axis 11 between pipe lengths 10 and 40 in order to position the disposable plug for temporarily blocking the passage of water through the line.

When pipes 10 and 40 are joined to coupling 12, the overall conduit along longitudinal axis 11 is characterized as having a wet side "A" joined to the waste water line of the structure and temporarily dry side "B". Ideally, pipe 10 extends to line 13 creating void space 15 while pipe 40 extends to line 14 creating void space 16. These void spaces are maintained through the use of spikes 17, 18, 20, and 22. Supported within this void space is a composite disposable plug, the details of which will be described hereinafter. However, it is noted when further reference is made to FIG. 1 that the disposable plug assembly is maintained in position through the use of coupling stops 21 and 23.

The disposable disk 26 comprises any material which remains structurally intact when dry and which loses its structural integrity when wet. It is believed that materials for use in this environment include compressed salt, sodium bicarbonate, flour, and sawdust noting that an ideal material would be a one-half inch thick disk or tablet of compressed salt. Those in the salt industry have been using three hundred fifty ton presses to produce such diverse items as salt blocks for horses and blocks for bunny licks and the same techniques can be employed to produce disk 26 for use herein.

As noted previously, dissolvable disk 26 must remain dry when performing its function of temporarily blocking the passage of water along longitudinal axis 11 from wet side "A" to dry side "B". This is done by placing a waterproof barrier 24 throughout the entire cylindrical surface of plug 26 as shown. Water impermeable layer 24 can be comprised of any material which can easily be applied to disk 26, which maintains its structural integrity when wet and which is capable of being at least partially removed enabling water to contact disk 26 when water testing has been completed. It has been found that a latex membrane stretched over disk 26, or a sealing wax, or paraffin melted over disk 26 are ideal for use in this environment.

In light of the water sensitivity of disk 26, particularly when composed of a compressed block of salt, as a preferred embodiment, a partial or complete layer of a suitable barrier material such as a latex balloon membrane described above can be stretched over the dry side of the disk as shown as layer 25 of FIG. 1. This would prevent condensed moisture from prematurely compromising the integrity of disk 26 when in place.

As noted above, once the test plug has been placed between pipes 10 and 40, a suitable water head is created in space "A" and the plumbing checked for leakage. After the test has been completed, a major advantage in practicing the present invention is that the barrier to water passage in the form of disk 26 and coating 24 can be dissolved and passed through the sewer line without removing the pipe connections or fittings. In order to accomplish this desired result, in a first embodiment, it is necessary to at least partially rupture barrier layer 24 in order to expose dissolvable disk 26 to water backing up in space "A" constituting the water pressure head within the structure.

There are a number of suitable ways to rupture water impermeable layer 24 to expose dissolvable disk 26 to water. It is noted that even a slight scarring or disruption of layer 24 would generally be sufficient to accomplish the goals of the present invention for it has been found that even a small amount of water seepage through layer 24 will undermine the structural integrity of disk 26 which, when coupled with the water pressure being exerted against disk 26, will cause it to structurally fail and travel to the sewer or septic area. Further, it is noted that disk 26, if made of compressed salt, sodium bicarbonate, flour, or sawdust is environmentally friendly while the wax, paraffin, or latex membrane presents little, if any, environmental concern noting that the amount of such material employed in practicing the present invention is considerably less than the amount of sealing wax used by a typical plumber in setting a toilet in a bathroom of the house or similar structure.

Figure 5:
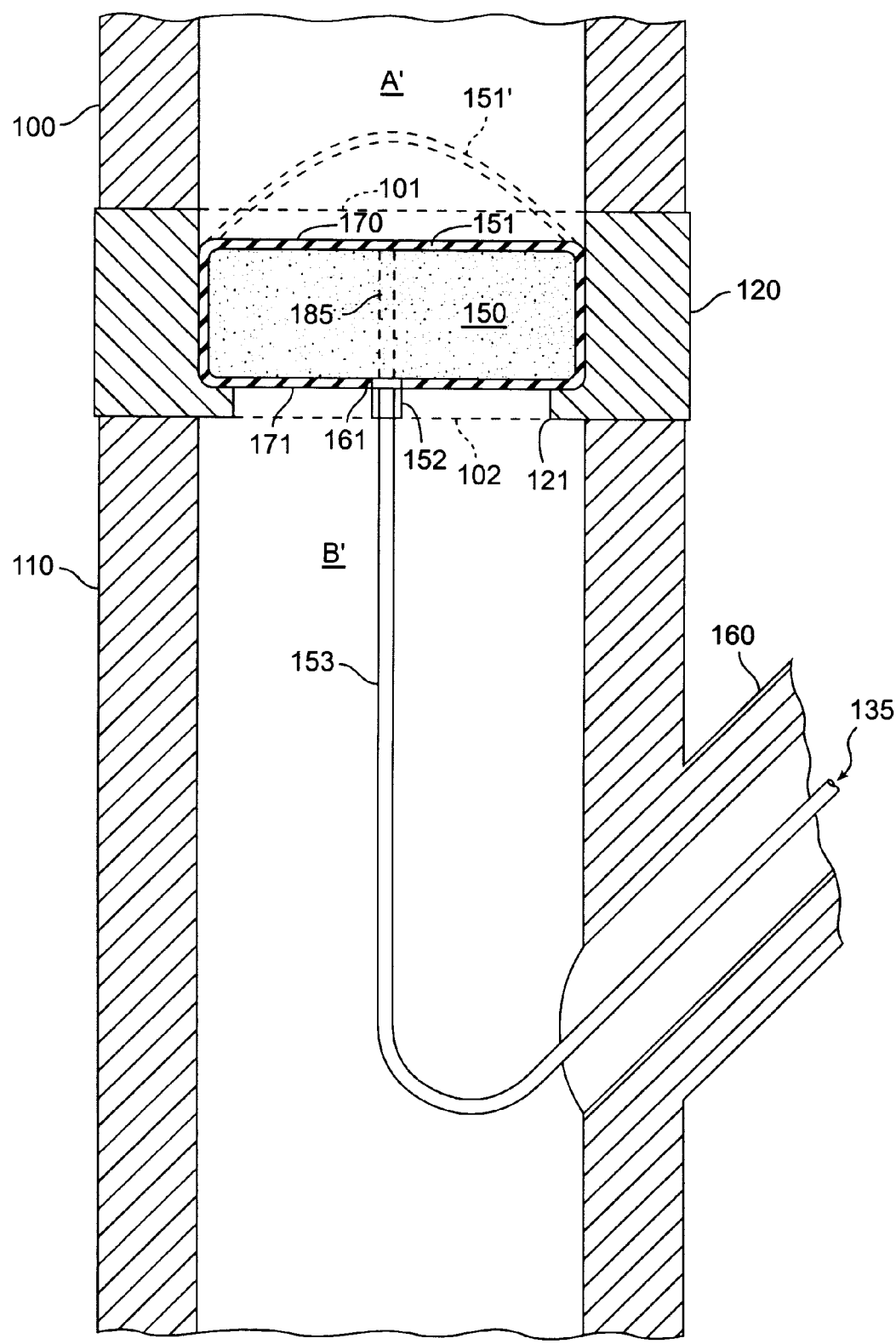
FIG. 5 is a cross-sectional view of yet a fourth embodiment of the present invention.

FIG. 5 is a depiction of a preferred embodiment of the present invention whereby disposable plug 120 is situated between pipe 100 and pipe 110 creating a wet side A' and a dry side B'. Disposable plug 120 is intended to operate as the previous embodiments whereby pipes 100 and 110 end at phantom lines 101 and 102 creating a space whereby cylindrically sized tablet 150 is retained by extending lip portions 121 selectively preventing water from passing from pipe 100 to pipe 110.

In the embodiment of FIG. 5, a wye or clean-out pipe 160 is shown extending diagonally from pipe 110 which is a common expedient for use in installations such as those contemplated herein.

In the embodiment shown in FIG. 5, it is contemplated that cylindrically shaped tablet 150 is surrounded at least on its upstream face 170 with a balloon-like membrane 151 which can encase virtually all of tablet 150 extending over a portion of the downstream face 171 extending to an area 161 surrounding fitting 152. Fitting 152 receives air hose 153 which, in turn, is a conduit for accepting pressurized air in the direction of arrow 135. Fitting 152 is positioned on downstream face 171 along hole 185 which is created between the upstream and downstream faces of cylindrically shaped tablet 150 so that upon the introduction of pressurized air through line 153, balloon 151 is expanded as shown in phantom at 151'. The expansion of balloon 151 continues until it ruptures exposing the cylindrically shaped tablet to water in area A' whereupon the tablet is caused to at least partially dissolve thus losing its structural integrity and freeing the space between pipes 100 and 110. When this is accomplished, fitting 152 and any remains of cylindrically shaped tablet 150 and balloon 151 can be withdrawn by simply pulling upon air line 153 through wye or clean-out pipe 160. In its ideal environment, cylindrically shaped tablet 150 is composed of a combination of sodium bicarbonate and citric acid which reacts rapidly with water while dissolving in aqueous media.

Figure 3:
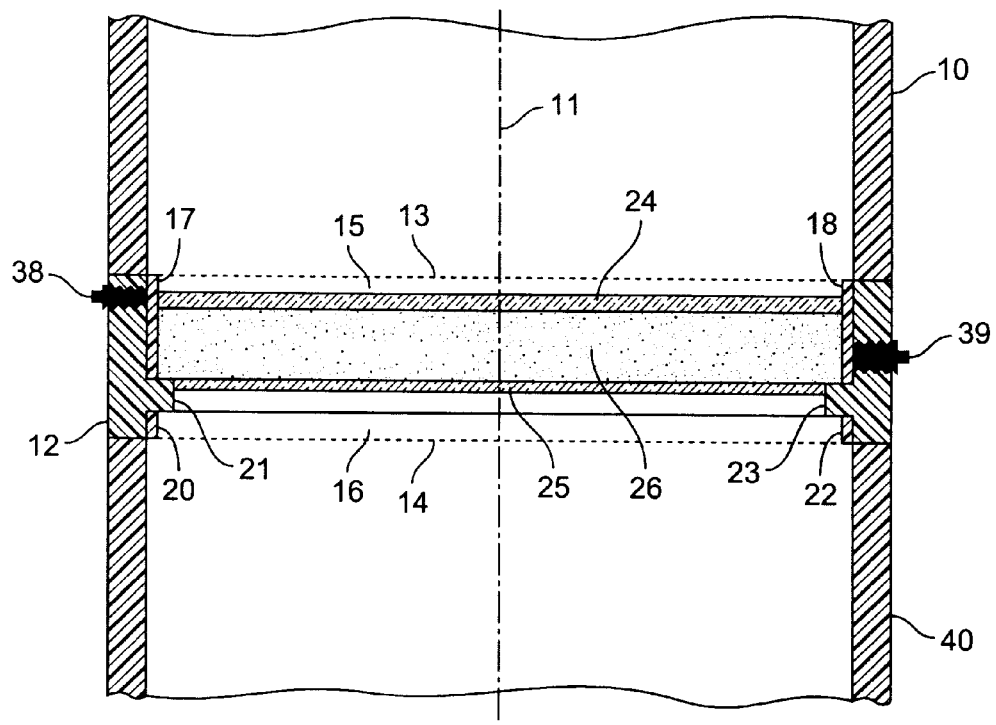
FIG. 3 is a cross-sectional view of yet a second embodiment of the present invention.

FIG. 3 illustrates two alternative means of rupturing water impermeable membrane 24. In each instance, a plug which passes through the side wall of conduit 12 can be used to compress and either rupture membrane 24 alone (plug 38) or the entire composite disposable membrane (plug 39). When plug 38 is employed, a rupture is established within membrane 24 by compressing plug 38 and subsequently withdrawing the plug to its original position. This creates a gap allowing for the passage of water to contact dissolvable disk 26. When plug 39 is employed, not only is membrane 24 ruptured but the structural integrity of disk 26 can also be compromised through the compressive force of plug 39.

Figure 4:
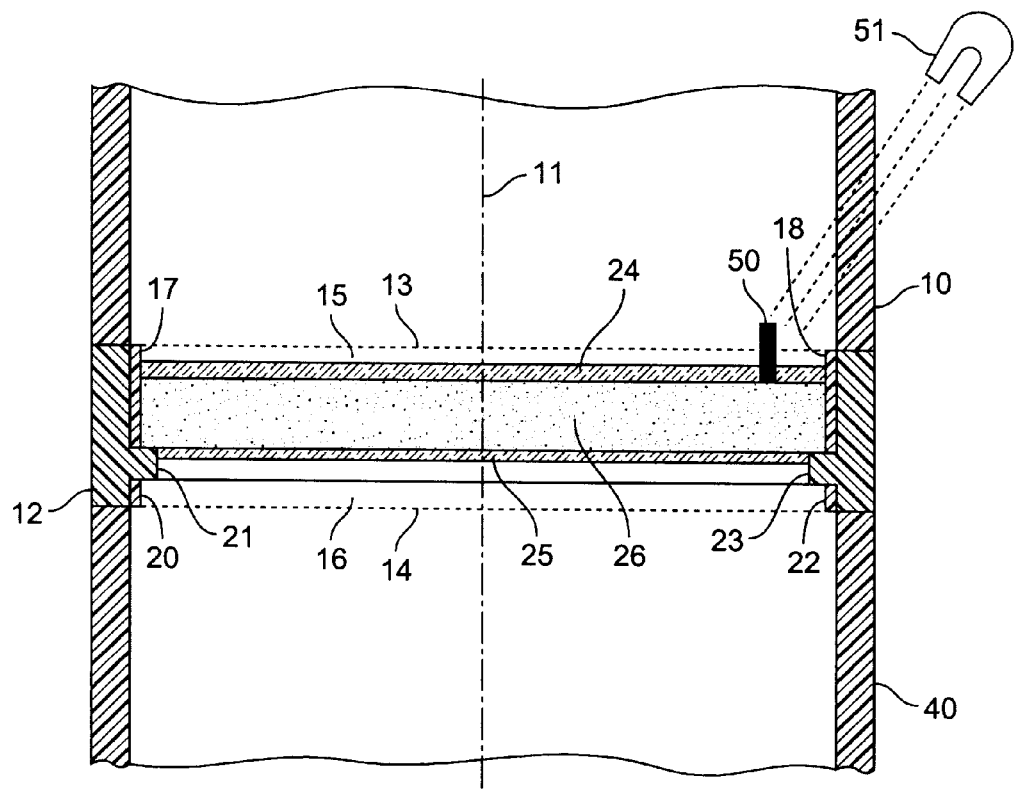
FIG. 4 is a cross-sectional view of still a third embodiment of the present invention.

As a further alternative, reference is made to FIG. 4. In this instance, a ceramic magnet 50 can be embedded within water impermeable layer 24. A strong magnet 51 such as one composed of neodymium can be placed proximate the side wall of pipe 10 causing magnet 50 to be dislodged from its position shown in FIG. 4. This creates a gap or opening within water impermeable layer 24 allowing the passage of water to proceed and contact disposable plug 26.

As a second embodiment, it is also possible to practice the present invention by mechanically structurally compromising the integrity of disposable disk 26 without rupturing water impermeable layer 24. In this regard, reference is made to FIG. 1 which shows a threaded plug 34 contained within void pocket 16. In use, threaded plug 34 can be dislodged from the side wall of conduit 12 exposing the interior of void pocket 16 to the user. A screwdriver or other sharp object can be angularly positioned through the opening created by the removal of plug 34 and tapped with a hammer or other suitable object to crack, break, or otherwise compromise the integrity of disk 26. Under normal conditions, the water head pressure within area "A" will be sufficient to break through water impermeable layer 24 when the structural integrity of disk 26 is compromised. If not, the elongated sharp object can continue to penetrate disk 26 until water impermeable layer 24 is reached which is thereupon ruptured allowing the passage of water to further erode disk 26.

As a further preferred expedient, the side wall of pipe 10 in the region containing water during testing can be provided with release plug 35. Plug 35 can be employed to drain the water head from the system without removing the disposable plug assembly of this invention in order to, for example, drain the system when the plumber's test has failed and remedial action is necessary. By draining the system without plug removal, once the repairs have been carried out, the water pressure head can be reestablished to retest the system anew.

I claim:

1. A disposable plug for installation in a cylindrical water line to temporarily block the water line to the passage of water therethrough, said disposable plug comprising a cylindrically shaped tablet having a diameter substantially equal to the diameter of the water line so that when installed within said water line, water is prevented from passing said disposable plug, said cylindrically shaped tablet being characterized as being at least partially dissolvable when contacted with water; a water impermeable membrane surrounding at least a portion of said cylindrically shaped tablet to selectively prevent water from contacting said cylindrically shaped tablet as long as said disposable plug acts to temporarily block said water line; and means for disrupting said water impermeable membrane a sufficient amount to allow water to contact said cylindrically shaped tablet when said water line is not intended to be so blocked.

2. The disposable plug of claim 1 wherein said cylindrically shaped tablet comprises a member selected from the group consisting of salt, flour, sawdust, and the combination of sodium bicarbonate and citric acid.

3. The disposable plug of claim 1 wherein said water impermeable membrane comprises paraffin wax.

4. The disposable plug of claim 1 wherein said water impermeable membrane comprises a latex balloon.

5. The disposable plug of claim 1 wherein said means for disrupting said water impermeable membrane comprises a threaded plug configured within said waste line located proximate to said water impermeable membrane such that when said threaded plug is brought into contact with said water impermeable membrane, said water impermeable membrane is disrupted allowing for water to contact said cylindrically shaped tablet.

6. The disposable plug of claim 5 wherein said cylindrically shaped tablet comprises the combination of sodium bicarbonate and citric acid.

7. The disposable plug of claim 1 wherein said means for disrupting said water impermeable membrane comprises a magnet embedded within said water impermeable membrane, said magnet being dislodgable from said water impermeable membrane when a second magnet is brought in proximity to said disposable plug from a location outside of said water line.

8. The disposable plug of claim 1 wherein said means for disrupting said water impermeable membrane comprises a removable threaded plug configured within said waste line such that when removed, an elongated object can be caused to pass through said waste line and contact said water impermeable membrane or said cylindrically shaped tablet.

9. A disposable plug for installation in a cylindrical water line to temporarily block the water line to the passage of water therethrough, said disposable plug comprising a cylindrically shaped tablet having an upstream face, a downstream face, and a diameter substantially equal to the diameter of the water line so that when installed within the water line, water is prevented from passing said disposable plug and a hole configured therein, between said upstream and downstream faces, said cylindrically shaped tablet being characterized as being at least partially dissolvable when contacted with water, an expandable balloon membrane surrounding at least a portion of said cylindrically shaped tablet to selectively prevent water from contacting said cylindrically shaped tablet as long as said expandable balloon membrane is intact over at least said upstream face, an air supply inlet at said hole for supplying pressurized air through said hole to said upstream face of said cylindrically shaped tablet and a supply of pressurized air sufficient to expand said expandable balloon membrane to rupture said expandable balloon membrane to allow water to contact said cylindrically shaped tablet when said water line is not intended to be so blocked.

10. A method for temporarily blocking the passage of water through a water waste line for creating a pressure head within said waste line, said method comprising installing a disposable plug within said waste line, said disposable plug comprising a disposable plug for installation in a cylindrical water line to temporarily block the water line to the passage of water therethrough, said disposable plug comprising a cylindrically shaped tablet having a diameter substantially equal to the diameter of the water line so that when installed within said water line, water is prevented from passing said disposable plug, said cylindrically shaped tablet being characterized as being at least partially dissolvable when contacted with water; a water impermeable membrane surrounding at least a portion of said cylindrically shaped tablet to selectively prevent water from contacting said cylindrically shaped tablet as long as said disposable plug acts to temporarily block said water line; and means for disrupting said water impermeable membrane a sufficient amount to allow water to contact said cylindrically shaped tablet when said water line is not intended to be so blocked.

11. A method for determining the integrity of a water waste line for water leakage, said method comprising installing a disposable plug within said waste line, said disposable plug comprising a disposable plug for installation in a cylindrical water line to temporarily block the water line to the passage of water therethrough, said disposable plug comprising a cylindrically shaped tablet having a diameter substantially equal to the diameter of the water line so that when installed within said water line, water is prevented from passing said disposable plug, said cylindrically shaped tablet being characterized as being at least partially dissolvable when contacted with water; a water impermeable membrane surrounding at least a portion of said cylindrically shaped tablet to selectively prevent water from contacting said cylindrically shaped tablet as long as said disposable plug acts to temporarily block said water line; and means for disrupting said water impermeable membrane a sufficient amount to allow water to contact said cylindrically shaped tablet when said water line is not intended to be so blocked; filling said waste line with water above said disposable plug and establishing a water pressure head therein and rupturing said water impermeable membrane after the integrity of the water waste line has been determined thus at least partially dissolving said cylindrically shaped tablet and causing said cylindrically shaped tablet to dislodge from said water waste line allowing for the passage of water therethrough.

* * * * *